US012625983B2

(12) United States Patent (10) Patent No.: US 12,625,983 B2

Hicks (45) Date of Patent: May 12, 2026

(54) ENCODING OF BINARY DATA FOR SECURE TRANSMISSION

(71) Applicant: INTERNATIONAL BUSINESS MACHINES CORPORATION, Armonk, NY (US)

(72) Inventor: Andrew C. M. Hicks, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 114 days.

(21) Appl. No.: 18/422,062

(22) Filed: Jan. 25, 2024

(65) Prior Publication Data

US 2025/0245359 A1 Jul. 31, 2025

(51) Int. Cl.
*G06F 21/60* (2013.01)

(52) U.S. Cl.
CPC ................................. *G06F 21/606* (2013.01)

(58) Field of Classification Search
CPC .................................................... G06F 21/606
See application file for complete search history.

(56) References Cited

U.S. PATENT DOCUMENTS

| | | | | |
|---|---|---|---|---|
| 6,373,986 B1 * | 4/2002 | Fink | ........................... | G06T 9/00 |
| | | | | 382/249 |
| 6,462,680 B1 * | 10/2002 | Hayes | ..................... | H03M 7/30 |
| | | | | 341/50 |
| 6,714,145 B1 * | 3/2004 | Marques | ................. | H03M 7/30 |
| | | | | 341/51 |
| 8,218,760 B2 | 7/2012 | Joye | | |
| 8,904,181 B1 | 12/2014 | Felsher et al. | | |
| 10,992,511 B2 * | 4/2021 | Flynn | .................. | H04L 63/0428 |
| 2005/0166191 A1 * | 7/2005 | Kandanchatha | ........ | G06F 21/50 |
| | | | | 717/137 |
| 2006/0125660 A1 * | 6/2006 | Jegou | ..................... | H03M 13/39 |
| | | | | 341/50 |
| 2011/0064215 A1 * | 3/2011 | Michiels | ................. | H04L 9/302 |
| | | | | 380/28 |
| 2013/0251147 A1 * | 9/2013 | Bonatto | ............... | H04L 9/0863 |
| | | | | 380/255 |
| 2015/0188564 A1 * | 7/2015 | Dickie | ................ | H03M 7/6005 |
| | | | | 708/203 |
| 2017/0272095 A1 * | 9/2017 | Revell | ..................... | H03M 7/30 |
| 2018/0131386 A1 | 5/2018 | Revell | | |

FOREIGN PATENT DOCUMENTS

EP 3284174 A1 2/2018

* cited by examiner

*Primary Examiner* — Lynn D Feild
*Assistant Examiner* — Ethan V Vo
(74) *Attorney, Agent, or Firm* — Onyx IP Group

(57) ABSTRACT

Encoding of binary data for secure transmission includes compressing, by a processing device, a binary object into a number. The processing device identifies one or more prime factors of the number. The processing device generates an encoded representation of the binary object including mapping each of the one or more prime factors to a corresponding prime factor representation in a plurality of prime factor representations for inclusion in the encoded representation.

20 Claims, 4 Drawing Sheets

100

300

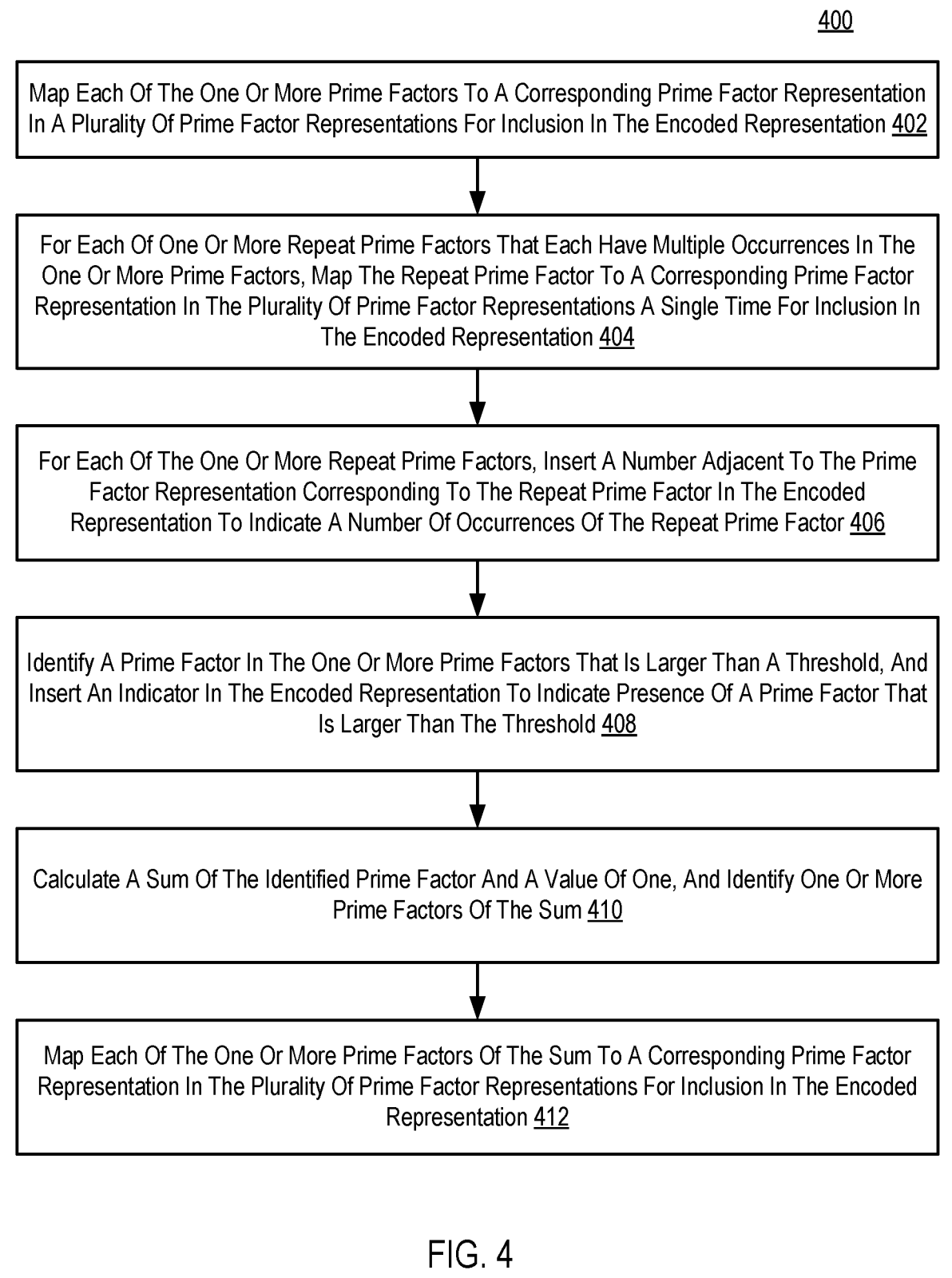

400

Map Each Of The One Or More Prime Factors To A Corresponding Prime Factor Representation In A Plurality Of Prime Factor Representations For Inclusion In The Encoded Representation 402

↓

For Each Of One Or More Repeat Prime Factors That Each Have Multiple Occurrences In The One Or More Prime Factors, Map The Repeat Prime Factor To A Corresponding Prime Factor Representation In The Plurality Of Prime Factor Representations A Single Time For Inclusion In The Encoded Representation 404

↓

For Each Of The One Or More Repeat Prime Factors, Insert A Number Adjacent To The Prime Factor Representation Corresponding To The Repeat Prime Factor In The Encoded Representation To Indicate A Number Of Occurrences Of The Repeat Prime Factor 406

↓

Identify A Prime Factor In The One Or More Prime Factors That Is Larger Than A Threshold, And Insert An Indicator In The Encoded Representation To Indicate Presence Of A Prime Factor That Is Larger Than The Threshold 408

↓

Calculate A Sum Of The Identified Prime Factor And A Value Of One, And Identify One Or More Prime Factors Of The Sum 410

↓

Map Each Of The One Or More Prime Factors Of The Sum To A Corresponding Prime Factor Representation In The Plurality Of Prime Factor Representations For Inclusion In The Encoded Representation 412

FIG. 4

ENCODING OF BINARY DATA FOR SECURE TRANSMISSION

BACKGROUND

The present disclosure relates to methods, apparatus, and products for encoding binary data for secure transmission.

SUMMARY

According to embodiments of the present disclosure, various methods, apparatus and products for encoding binary data for secure transmission are described herein. In some aspects, encoding binary data for secure transmission includes compressing, by a processing device, a binary object into a number. The processing device identifies one or more prime factors of the number. The processing device generates an encoded representation of the binary object including mapping each of the one or more prime factors to a corresponding prime factor representation in a plurality of prime factor representations for inclusion in the encoded representation.

BRIEF DESCRIPTION OF THE DRAWINGS

FIG. 4 sets forth a flowchart of an example method for generating an encoded representation of a binary object according to aspects of the present disclosure.

DETAILED DESCRIPTION

Figure 1:
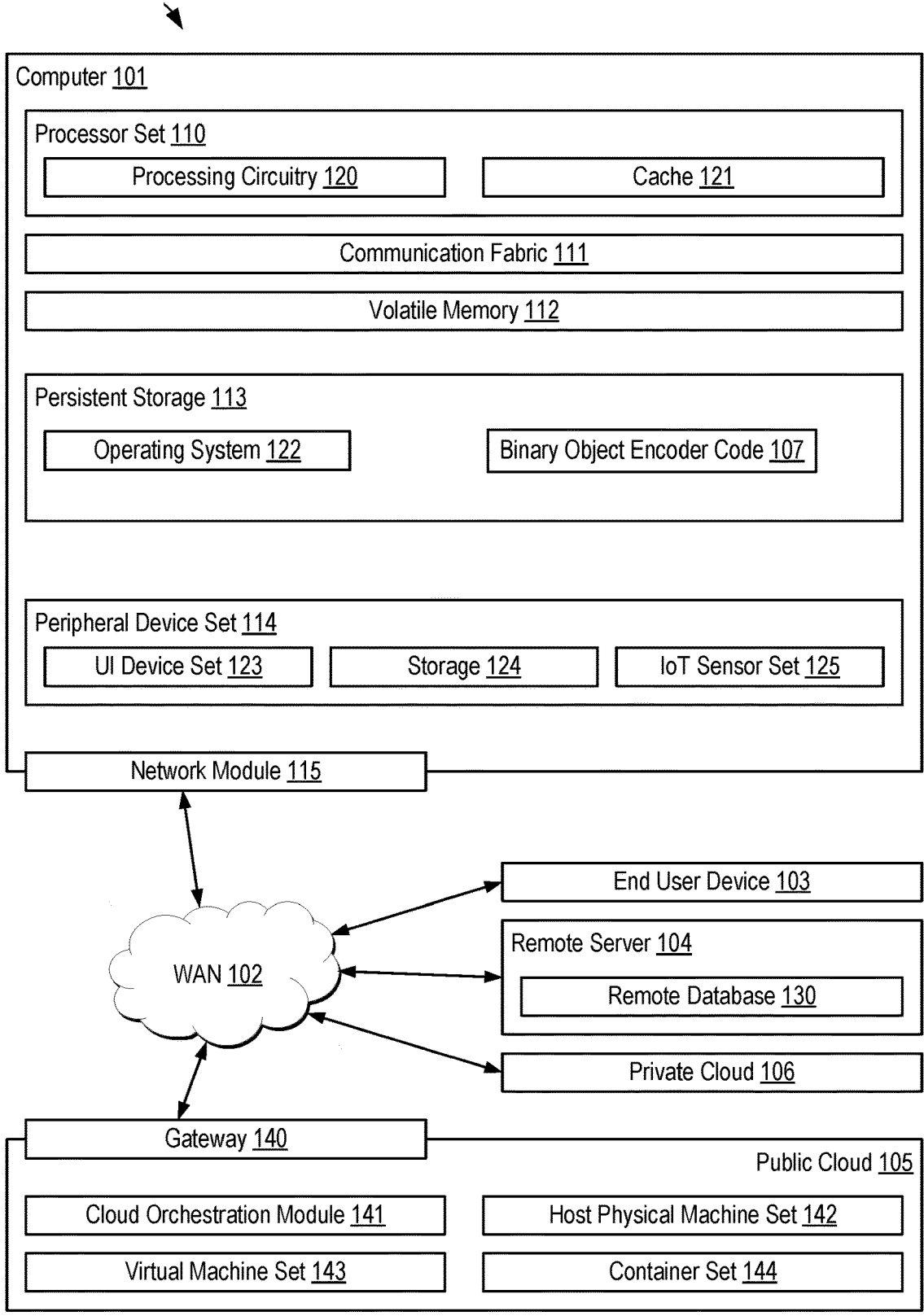
FIG. 1 sets forth an example computing environment according to aspects of the present disclosure.

A black site is a site that is not connected to the internet. A black site may be maintained by an organization to ensure the security of data. However, it may be difficult to securely provide data to a black site, such as software patches or updates or any other types of data, due to the lack of internet communications. Similarly, it may be difficult to securely transmit data from a black site. For example, a NASA satellite in space may have vast amounts of data to transmit back to Earth, but doing so efficiently and securely is a major challenge.

Some examples disclosed herein are directed to encoding of binary data for secure transmission, such as transmission to a receiving computing device to recover and use the binary data. An encoded representation of a binary object is generated that may be transmitted to a receiving computing device, such as a receiving computing device at a black site. The encoded representation could be sent via email, for example, and entered into a computing device at a black site to recover and use the binary data. The encoded representation may also be transmitted from a computing device at the black site to a receiving computing device outside of the black site.

An example of the present disclosure is directed to a method for encoding binary data for secure transmission, which includes compressing, by a processing device, a binary object into a number. The method includes identifying, by the processing device, one or more prime factors of the number. The method includes generating, by the processing device, an encoded representation of the binary object including mapping each of the one or more prime factors to a corresponding prime factor representation in a plurality of prime factor representations for inclusion in the encoded representation. This method has the technical effect of improving the efficiency and security of data storage and transmission by a computing device. The compression results in a reduction of data to be stored and/or transmitted, and the identifying the prime factors and generating the encoded representation result in a further reduction of data to be stored and/or transmitted, while maintaining the ability to accurately recover the binary object.

The method may also include storing, in a memory, the encoded representation; and transmitting the stored encoded representation to a receiving computing device to recover the binary object from the encoded representation. This has the technical effect of improving the efficiency and security of data stored in the memory as a relatively small, encoded representation may be stored in the memory to securely and efficiently represent a relatively large quantity of binary data. This also has the technical effect of improving the efficiency and security of data transmission by transmitting to the receiving computing device a relatively small, encoded representation to securely and efficiently represent a relatively large quantity of binary data.

Each of the prime factor representations in the method may be a multiple-letter word. This has the technical effect of providing a more user-friendly encoded representation that may be efficiently and accurately used at a receiving computing device to recover the binary object.

The one or more prime factors in the method may include one or more repeat prime factors that each have multiple occurrences, and generating the encoded representation of the binary object may include, for each of the one or more repeat prime factors, mapping the repeat prime factor to a corresponding prime factor representation in the plurality of prime factor representations a single time for inclusion in the encoded representation. This has the technical effect of further improving the efficiency and security of data storage and transmission by a computing device as repeat prime factors are each represented a single time in the encoded representation rather than being repeated.

Generating the encoded representation of the binary object in the method may include, for each of the one or more repeat prime factors, inserting a number adjacent to the prime factor representation corresponding to the repeat prime factor in the encoded representation to indicate a number of occurrences of the repeat prime factor. This has the technical effect of further improving the efficiency and security of data storage and transmission by a computing device as repeat prime factors are each represented a single time in the encoded representation with a number adjacent to the prime factor representation, and also facilitates accurate recovery of the binary object.

Generating the encoded representation of the binary object in the method may include identifying a prime factor in the one or more prime factors that is larger than a threshold, and inserting an indicator in the encoded representation to indicate presence of a prime factor that is larger than the threshold. This has the technical effect of allowing a smaller set of prime factor representations to be stored and used resulting in further improving the efficiency and security of data storage and transmission by a computing device.

Generating the encoded representation of the binary object in the method may include calculating a sum of the identified prime factor and a value of one, and identifying one or more prime factors of the sum. This has the technical effect of substantially reducing a large prime factor to smaller prime factors, which allows a smaller set of prime factor representations to be stored and used resulting in further improving the efficiency and security of data storage and transmission by a computing device.

Generating the encoded representation of the binary object in the method may include mapping each of the one or more prime factors of the sum to a corresponding prime factor representation in the plurality of prime factor representations for inclusion in the encoded representation. This has the technical effect of representing a large prime factor with prime factor representations of smaller prime factors, which allows a smaller set of prime factor representations to be stored and used resulting in further improving the efficiency and security of data storage and transmission by a computing device.

Another example of the present disclosure is directed to an apparatus for encoding binary data for secure transmission, which includes a processing device, and a memory operatively coupled to the processing device. The memory stores computer program instructions that, when executed, cause the processing device to compress a binary object into a number. The memory stores computer program instructions that, when executed, cause the processing device to identify one or more prime factors of the number. The memory also stores computer program instructions that, when executed, cause the processing device to generate an encoded representation of the binary object including mapping each of the one or more prime factors to a corresponding prime factor representation in a plurality of prime factor representations for inclusion in the encoded representation. This apparatus provides the technical effect of improving the efficiency and security of data storage and transmission. The compression results in a reduction of data to be stored and/or transmitted, and the identifying the prime factors and generating the encoded representation result in a further reduction of data to be stored and/or transmitted, while maintaining the ability to accurately recover the binary object.

The memory of the apparatus may also store computer program instructions that, when executed, cause the processing device to store, in the memory, the encoded representation; and transmit the stored encoded representation to a receiving computing device to recover the binary object from the encoded representation. This has the technical effect of improving the efficiency and security of data stored in the memory as a relatively small, encoded representation may be stored in the memory to securely and efficiently represent a relatively large quantity of binary data. This also has the technical effect of improving the efficiency and security of data transmission by transmitting to the receiving computing device a relatively small, encoded representation to securely and efficiently represent a relatively large quantity of binary data.

Each of the prime factor representations of the apparatus may be a multiple-letter word. This has the technical effect of providing a more user-friendly encoded representation that may be efficiently and accurately used at a receiving computing device to recover the binary object.

The one or more prime factors of the apparatus may include one or more repeat prime factors that each have multiple occurrences, and generating the encoded representation of the binary object may include, for each of the one or more repeat prime factors, mapping the repeat prime factor to a corresponding prime factor representation in the plurality of prime factor representations a single time for inclusion in the encoded representation. This has the technical effect of further improving the efficiency and security of data storage and transmission as repeat prime factors are each represented a single time in the encoded representation rather than being repeated.

Generating the encoded representation of the binary object by the apparatus may include, for each of the one or more repeat prime factors, inserting a number adjacent to the prime factor representation corresponding to the repeat prime factor in the encoded representation to indicate a number of occurrences of the repeat prime factor. This has the technical effect of further improving the efficiency and security of data storage and transmission as repeat prime factors are each represented a single time in the encoded representation with a number adjacent to the prime factor representation rather than being repeated, and also facilitates accurate recovery of the binary object.

Generating the encoded representation of the binary object by the apparatus may include identifying a prime factor in the one or more prime factors that is larger than a threshold, and inserting an indicator in the encoded representation to indicate presence of a prime factor that is larger than the threshold. This has the technical effect of allowing a smaller set of prime factor representations to be stored and used resulting in further improving the efficiency and security of data storage and transmission.

Generating the encoded representation of the binary object by the apparatus may include calculating a sum of the identified prime factor and a value of one, and identifying one or more prime factors of the sum. This has the technical effect of substantially reducing a large prime factor to smaller prime factors, which allows a smaller set of prime factor representations to be stored and used resulting in further improving the efficiency and security of data storage and transmission by a computing device.

Generating the encoded representation of the binary object by the apparatus may include mapping each of the one or more prime factors of the sum to a corresponding prime factor representation in the plurality of prime factor representations for inclusion in the encoded representation. This has the technical effect of representing a large prime factor with prime factor representations of smaller prime factors, which allows a smaller set of prime factor representations to be stored and used resulting in further improving the efficiency and security of data storage and transmission by a computing device.

Another example of the present disclosure is directed to a computer program product for encoding binary data for secure transmission, comprising a computer readable storage medium, wherein the computer readable storage medium comprises computer program instructions that, when executed compress a binary object into a number; identify one or more prime factors of the number; and generate an encoded representation of the binary object including mapping each of the one or more prime factors to a corresponding prime factor representation in a plurality of prime factor representations for inclusion in the encoded representation. This computer program product provides the technical effect of improving the efficiency and security of data storage and transmission by a computing device. The compression results in a reduction of data to be stored and/or transmitted, and the identifying the prime factors and generating the encoded representation result in a further reduction of data to be stored and/or transmitted, while maintaining the ability to accurately recover the binary object.

The one or more prime factors of the computer program product may include one or more repeat prime factors that each have multiple occurrences, and generating the encoded representation of the binary object may include, for each of the one or more repeat prime factors, mapping the repeat prime factor to a corresponding prime factor representation in the plurality of prime factor representations a single time for inclusion in the encoded representation and inserting a number adjacent to the prime factor representation corresponding to the repeat prime factor in the encoded representation to indicate a number of occurrences of the repeat prime factor. This has the technical effect of further improving the efficiency and security of data storage and transmission as repeat prime factors are each represented a single time in the encoded representation with a number adjacent to the prime factor representation rather than being repeated, and also facilitates accurate recovery of the binary object.

Generating the encoded representation of the binary object with the computer program product may include identifying a prime factor in the one or more prime factors that is larger than a threshold, and inserting an indicator in the encoded representation to indicate presence of a prime factor that is larger than the threshold. This has the technical effect of allowing a smaller set of prime factor representations to be stored and used resulting in further improving the efficiency and security of data storage and transmission.

Generating the encoded representation of the binary object with the computer program product may include calculating a sum of the identified prime factor and a value of one, identifying one or more prime factors of the sum, and mapping each of the one or more prime factors of the sum to a corresponding prime factor representation in the plurality of prime factor representations for inclusion in the encoded representation. This has the technical effect of substantially reducing a large prime factor to smaller prime factors, which allows a smaller set of prime factor representations to be stored and used resulting in further improving the efficiency and security of data storage and transmission by a computing device.

In some examples, the encoded representation may be a relatively small, encoded passphrase that can be decoded into a large quantity of binary data. Such a passphrase may represent a large quantity of data, such as the entire Ubuntu operating system distribution or another operating system, a software application, software patches or updates, or other binary data. In some examples, when sending data to a black site via the encoded representation, one does not need to connect anything to the internet, but rather type in a relatively small, encoded representation. As another example, a satellite near Saturn could use the techniques disclosed herein to send large amounts of data back to Earth using one or more relatively small, encoded representations. One could back up their cell phone, and if it is lost, rebuild the data with the encoded representation, which may be a relatively small text string. One could also install a relatively large file on their computing device by simply remembering and entering the encoded representation, which again may be a relatively small text string.

FIG. 1 sets forth an example computing environment according to aspects of the present disclosure. Computing environment 100 contains an example of an environment for the execution of at least some of the computer code involved in performing the various methods described herein, such as binary object encoder code 107. In addition to binary object encoder code 107, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and binary object encoder code 107, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document. These computer readable program instructions are stored in various types of computer readable storage media, such as cache 121 and the other storage media discussed below. The program instructions, and associated data, are accessed by processor set 110 to control and direct performance of the computer-implemented methods. In computing environment 100, at least some of the instructions for performing the computer-implemented methods may be stored in binary object encoder code 107 in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in binary object encoder code 107 typically includes at least some of the computer code involved in performing the computer-implemented methods described herein.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database), this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the computer-implemented methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
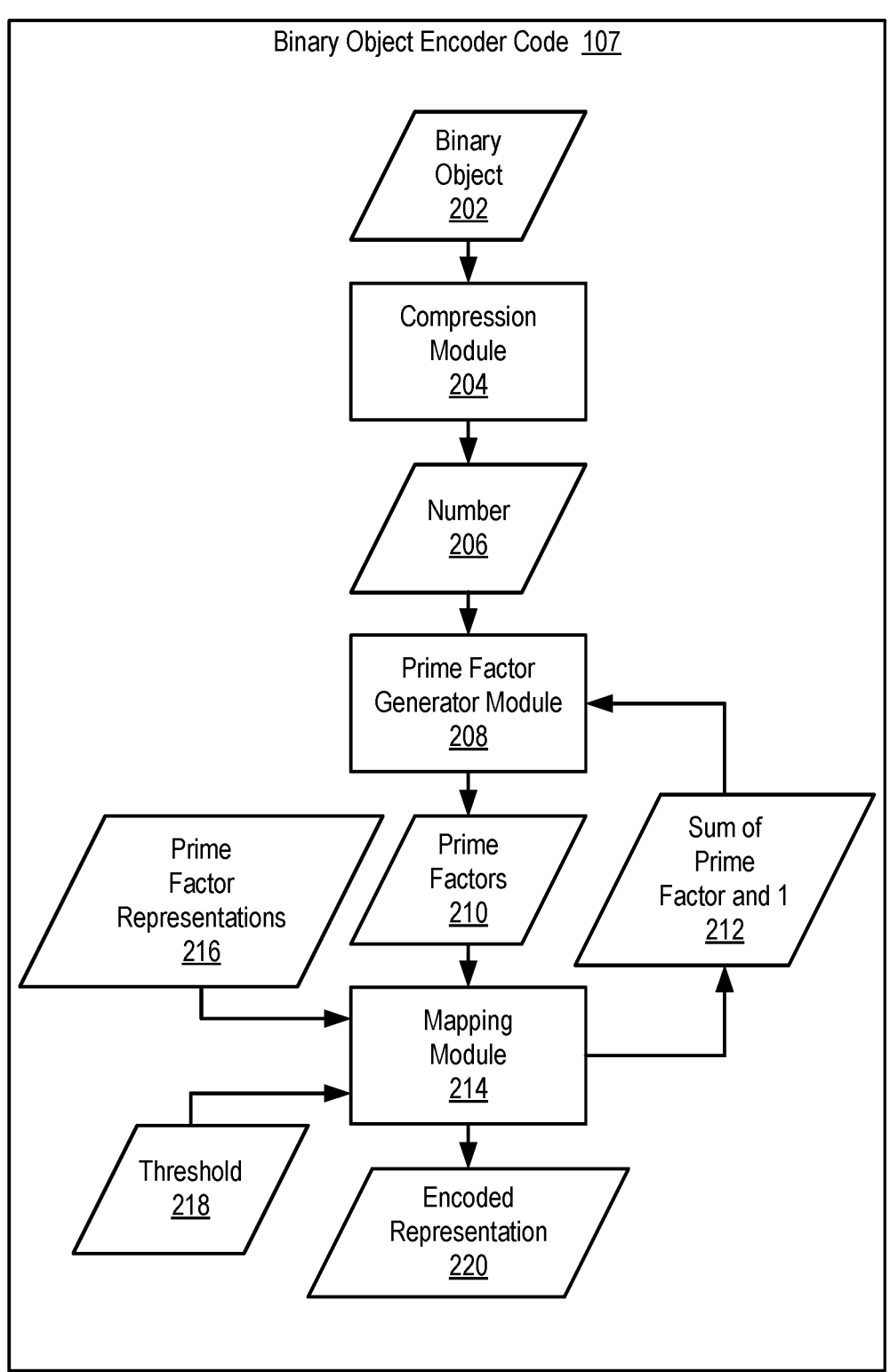
FIG. 2 sets forth an example implementation of the binary object encoder code shown in FIG. 1 according to aspects of the present disclosure.

FIG. 2 sets forth an example implementation of the binary object encoder code 107 shown in FIG. 1 according to aspects of the present disclosure. The binary object encoder code 107 includes compression module 204, prime factor generator module 208, and mapping module 214. Compression module 204 receives a binary object 202 and compresses it into a number 206. In an example, binary object 202 includes a plurality of binary bits, and number 206 is a decimal based number. In an example, compression module 204 uses a lossless Huffman compression method to compress the binary object 202 into the number 206. In an example, the compression module 204 compresses the binary object 202 into a number 206 that is the smallest number possible. In other examples, a different compression method may be used, such as a counting compression method (e.g., two ones, three zeros, etc.). As an example, a binary object 202 that is equal to "1001000010111101011" may be compressed into a number 206 that is equal to "12141131112".

Prime factor generator module 208 processes the number 206 generated by compression module 204 and identifies one or more prime factors 210 of the number. Using the example in which the number 206 is equal to "12141131112", the prime factor generator module 208 may generate the prime factors 210 as follows: "2×2×2×3×3× 11×15329711=12141131112".

Mapping module 214 generates an encoded representation 220 of the binary object 202, which includes mapping each of the one or more prime factors 210 to a corresponding prime factor representation in a plurality of prime factor representations 216 for inclusion in the encoded representation 220. In an example, each of the prime factor representations 216 is a multiple-letter word. Using multiple-letter words for the prime factor representations 216 results in a more user friendly system, as humans are more likely to recognize and accurately reproduce the words than they might for a random string of data. For example, the prime factor representations 216 may all be three-letter words in the English dictionary, with each of the three-letter words assigned to a different prime number. In other examples, other types of prime factor representations 216 may be used, including shorter or longer words, words of varying length, a randomized ordering of words rather than an alphabetical ordering, capitalization of letters, symbols rather than words, as well as others.

There are 1063 three-letter words in the English dictionary, which allows 1063 different prime numbers to be uniquely mapped to a corresponding three-letter word. In an implementation of this example, a partial mapping of prime numbers to three-letter words may be as follows:

2→ace
3→act
5→add
7→age
11→ago
13→aha
. . .
389→map
. . .
821→peg

Using the above correspondence between prime numbers and three-letter words, the mapping module 214 may map the prime factors "2×2×2×3×3×11" from the above example to three-letter words as follows: "3Ace2ActAgo". In this example, the one or more prime factors 210 includes one or more repeat prime factors that each have multiple occurrences. Specifically, the prime factor "2" has three occurrences, and the prime factor "3" has two occurrences. In an example, generating the encoded representation 220 of the binary object 202 includes, for each of the one or more repeat prime factors, mapping the repeat prime factor to a corresponding prime factor representation in the plurality of prime factor representations a single time for inclusion in the encoded representation. In the above example, "Ace" and "Act" appear a single time in the encoded representation despite multiple occurrences of their corresponding prime numbers. For each of the one or more repeat prime factors, mapping module 214 may insert a number adjacent to the prime factor representation corresponding to the repeat prime factor in the encoded representation 220 to indicate a number of occurrences of the repeat prime factor. Thus, the prime factors "2×2×2×3×3×11" with the repeat prime factors "2" and "3" map to three-letter words as follows: "3 Ace2ActAgo".

Generating the encoded representation 220 of the binary object 202 may include identifying a prime factor in the one or more prime factors 210 that is larger than a threshold 218, and inserting an indicator in the encoded representation 220 to indicate presence of a prime factor that is larger than the threshold 218. In an example, a plus sign may be used as the indicator. In other examples, other indicators may be used.

The threshold 218 may equal the largest prime number that is represented by a prime factor representation in the prime factor representations 216. Thus, in the above example, if it is determined that the remaining prime factor "15329711" is above the threshold 218, a "+" may be added to the encoded representation 220 as follows: "3 Ace2ActAgo+".

When mapping module 214 identifies a prime factor in the one or more prime factors 210 that is larger than a threshold 218, mapping module 214 may calculate a sum 212 of the identified prime factor and a value of one, and provide the sum 212 to prime factor generator module 208 to identify one or more prime factors of the sum. Using the example of a prime factor of "15329711", prime factor generator module 208 may identify the prime factors as follows: "(15329711+1)=2×2×2×2×3×389×821". Adding one to the identified prime factor results in an even number and guarantees that the next set of prime factors are less than the square root of the identified prime factor (e.g., less than the square root of 15329711). Thus, the likelihood of getting smaller prime numbers that fit into the (2, 3, 5, 7) category, for example, is substantially increased. Since prime numbers grow in discovery logarithmically, as the number 206 becomes larger, there are more occurrences of the lower prime numbers (e.g., 18Ace vs. 3Ace).

Generating the encoded representation 220 of the binary object 202 includes mapping each of the one or more prime factors of the sum 212 to a corresponding prime factor representation in the plurality of prime factor representations 216 for inclusion in the encoded representation 220. Using the example of "2×2×2×2×3×389×821" being the prime factors of the sum 212, the final version of the encoded representation 220 will then be: "3Ace2ActAgo+4AceAct-MapPeg". Decoding this encoded representation 220 using a reverse version of the process discussed above will result in the original binary string "100100001011101011". The encoded representation 220 may be stored in memory (e.g., volatile memory 112, persistent storage 113, and/or storage 124). The encoded representation 220 may also be transmitted to a receiving computing device to recover the binary object 202 from the encoded representation 220 and using the recovered binary object. Recovering the binary object 202 involves reversing the steps that were performed to generate the encoded representation 220 of the binary object 202.

In an example, generating the encoded representation 220 may be a n^n^n time complexity, so due to it being np incomplete, one may not know how long it will take to complete the process. It may also take the same amount of time to decode the encoded representation 220, so that if it takes three hours to generate the encoded representation 220, it may take three hours or more to decode the encoded representation 220. Performing the encoded representation generation with quantum computing would allow the data to be sent in n time, and there would be no time difference between sending any file, a whole server, or a simple text message of "hello", which would take the same time to transfer across the internet. Once the encoded representation 220 is generated, it may represent a large quantity of data. For example, the use of thirteen three-letter words and thirteen numbers for the encoded representation 220 may represent eighteen exabytes of data. This large quantity of data may be efficiently and securely stored and transmitted using the encoded representation 220.

Figure 3:
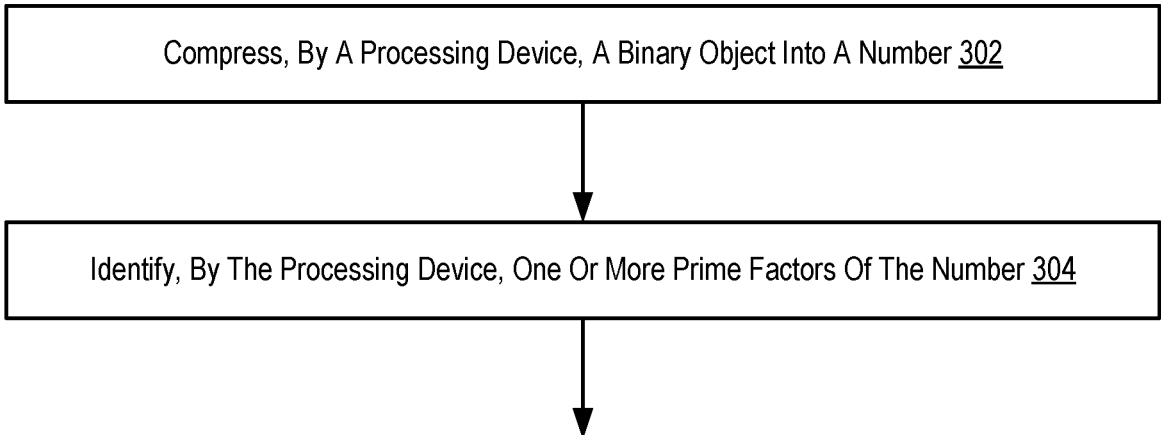
FIG. 3 sets forth a flowchart of an example method for encoding binary data for secure transmission according to aspects of the present disclosure.

FIG. 3 sets forth a flowchart of an example method 300 for encoding binary data for secure transmission according to aspects of the present disclosure. In a particular embodiment, the method 300 of FIG. 3 is performed utilizing the binary object encoder code 107. The method 300 of FIG. 3 includes compressing 302, by a processing device, a binary object into a number. The method 300 further includes identifying 304, by the processing device, one or more prime factors of the number. The method 300 further includes generating 306, by the processing device, an encoded representation of the binary object including mapping each of the one or more prime factors to a corresponding prime factor representation in a plurality of prime factor representations for inclusion in the encoded representation.

In some embodiments, method 300 further includes storing, in a memory, the encoded representation; and transmitting the stored encoded representation to a receiving computing device to recover the binary object from the encoded representation. In some embodiments of method 300, each of the prime factor representations is a multiple-letter word.

FIG. 4 sets forth a flowchart of an example method 400 for generating an encoded representation of a binary object according to aspects of the present disclosure. In a particular embodiment, the method 400 of FIG. 4 is performed utilizing the binary object encoder code 107. A portion or all of method 400 may be performed as part of the generating 306, by the processing device, an encoded representation of the binary object of method 300. The method 400 may be performed using one or more prime factors that are generated based on a binary object to be encoded. The method 400 of FIG. 4 includes mapping 402 each of the one or more prime factors to a corresponding prime factor representation in a plurality of prime factor representations for inclusion in the encoded representation. The method 400 further includes, for each of one or more repeat prime factors that each have multiple occurrences in the one or more prime factors, map 404 the repeat prime factor to a corresponding prime factor representation in the plurality of prime factor representations a single time for inclusion in the encoded representation. The method 400 further includes, for each of the one or more repeat prime factors, inserting 406 a number adjacent to the prime factor representation corresponding to the repeat prime factor in the encoded representation to indicate a number of occurrences of the repeat prime factor. The method 400 further includes identifying 408 a prime factor in the one or more prime factors that is larger than a threshold, and inserting an indicator in the encoded representation to indicate presence of a prime factor that is larger than the threshold. The method 400 further includes calculating 410 a sum of the identified prime factor and a value of one, and identifying one or more prime factors of the sum. The method 400 further includes mapping 412 each of the one or more prime factors of the sum to a corresponding prime factor representation in the plurality of prime factor representations for inclusion in the encoded representation.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for encoding binary data for secure transmission, comprising:

compressing, by a processing device, a binary object into a number;

identifying, by the processing device, one or more prime factors of the number; and generating, by the processing device, an encoded representation of the binary object including mapping each of the one or more prime factors to a corresponding prime factor representation in a plurality of prime factor representations for inclusion in the encoded representation, wherein generating the encoded representation of the binary object includes:

identifying a prime factor, in the one or more prime factors, that exceeds a threshold, and including, in the encoded representation, a character to indicate a presence of the prime factor that exceeds the threshold, wherein the character is included prior to a prime factor representation associated with the prime factor that exceeds the threshold, and wherein, when the one or more prime factors include an additional prime factor that does not exceed the threshold, the character is included between the prime factor representation associated with the prime factor that exceeds the threshold and an additional prime factor representation mapped to the additional prime factor.

2. The method of claim 1, and further comprising:

storing, in a memory, the encoded representation; and transmitting the stored encoded representation to a receiving computing device to recover the binary object from the encoded representation.

3. The method of claim 1, wherein each of the prime factor representations is a multiple-letter word.

4. The method of claim 1, wherein the one or more prime factors includes one or more repeat prime factors that each have multiple occurrences, and wherein generating the encoded representation of the binary object includes, for each of the one or more repeat prime factors, mapping the repeat prime factor to a corresponding prime factor representation in the plurality of prime factor representations a single time for inclusion in the encoded representation.

5. The method of claim 4, wherein generating the encoded representation of the binary object includes, for each of the one or more repeat prime factors, inserting a number adjacent to the prime factor representation corresponding to the repeat prime factor in the encoded representation to indicate a number of occurrences of the repeat prime factor.

6. The method of claim 1, wherein generating the encoded representation of the binary object includes mapping the prime factor representation, associated with the prime factor that exceeds the threshold, to a sum of the prime factor and a value of one.

7. The method of claim 6, wherein generating the encoded representation of the binary object includes calculating the sum of the prime factor and the value of one, and identifying one or more prime factors of the sum.

8. The method of claim 7, wherein generating the encoded representation of the binary object includes mapping each of the one or more prime factors of the sum to a corresponding prime factor representation in the plurality of prime factor representations for inclusion in the encoded representation.

9. An apparatus for encoding binary data for secure transmission, comprising:

a processing device; and memory operatively coupled to the processing device, wherein the memory stores computer program instructions that, when executed, cause the processing device to:

compress a binary object into a number;

identify one or more prime factors of the number; and generate an encoded representation of the binary object including mapping each of the one or more prime factors to a corresponding prime factor representation in a plurality of prime factor representations for inclusion in the encoded representation, wherein, the computer program instructions that cause the processing device to generate the encoded representation of the binary object, cause the processing device to:

include, in the encoded representation, a character to indicate a presence of a prime factor that exceeds a threshold when the one or more prime factors include the prime factor that exceeds the threshold, wherein the character is included prior to a prime factor representation associated with the prime factor, and wherein, when the one or more prime factors include an additional prime factor that does not exceed the threshold, the character is included between the prime factor representation associated with the prime factor and an additional prime factor representation mapped to the additional prime factor.

10. The apparatus of claim 9, wherein the memory stores computer program instructions that, when executed, cause the processing device to:

store, in the memory, the encoded representation; and transmit the stored encoded representation to a receiving computing device to recover the binary object from the encoded representation.

11. The apparatus of claim 9, wherein each of the prime factor representations is a multiple-letter word.

12. The apparatus of claim 9, wherein the one or more prime factors includes one or more repeat prime factors that each have multiple occurrences, and wherein the computer program instructions that cause the processing device to generate the encoded representation of the binary object includes, for each of the one or more repeat prime factors, cause the processing device to map the repeat prime factor to a corresponding prime factor representation in the plurality of prime factor representations a single time for inclusion in the encoded representation.

13. The apparatus of claim 12, wherein the computer program instructions that cause the processing device to generate the encoded representation of the binary object cause the processing device to insert, for each of the one or more repeat prime factors, a number adjacent to the prime factor representation corresponding to the repeat prime factor in the encoded representation to indicate a number of occurrences of the repeat prime factor.

14. The apparatus of claim 9, wherein the computer program instructions that cause the processing device to generate the encoded representation of the binary object cause the processing device to identify the prime factor in the one or more prime factors that exceeds the threshold.

15. The apparatus of claim 14, wherein the computer program instructions that cause the processing device to generate the encoded representation of the binary object cause the processing device to calculate a sum of the prime factor and a value of one, and map the prime factor representation, associated with the prime factor that exceeds the threshold, to the sum.

16. The apparatus of claim 15, wherein the computer program instructions that cause the processing device to generate the encoded representation of the binary object cause the processing device to map each of the one or more prime factors of the sum to a corresponding prime factor representation in the plurality of prime factor representations for inclusion in the encoded representation.

17. A computer program product for encoding binary data for secure transmission, comprising a computer readable storage medium, wherein the computer readable storage medium comprises computer program instructions that, when executed:

compress a binary object into a number;

identify one or more prime factors of the number; and generate an encoded representation of the binary object including mapping each of the one or more prime factors to a corresponding prime factor representation in a plurality of prime factor representations for inclusion in the encoded representation, wherein, the computer program instructions, that when executed generate the encoded representation of the binary object, when executed:

include, in the encoded representation, a character to indicate a presence of a prime factor that exceeds the threshold when the one or more prime factors include the prime factor that exceeds the threshold, wherein the character is included prior to a prime factor representation associated with the prime factor, and wherein, when the one or more prime factors include an additional prime factor that does not exceed the threshold, the character is included between the prime factor representation associated with the prime factor and an additional prime factor representation mapped to the additional prime factor.

18. The computer program product of claim 17, wherein the one or more prime factors includes one or more repeat prime factors that each have multiple occurrences, and wherein the computer program instructions, that when executed generate the encoded representation of the binary object, when executed, for each of the one or more repeat prime factors, map the repeat prime factor to a corresponding prime factor representation in the plurality of prime factor representations a single time for inclusion in the encoded representation and insert a number adjacent to the prime factor representation corresponding to the repeat prime factor in the encoded representation to indicate a number of occurrences of the repeat prime factor.

19. The computer program product of claim 17, wherein the computer program instructions, that when executed generate the encoded representation of the binary object, when executed identify the a prime factor in the one or more prime factors that exceeds the threshold.

20. The computer program product of claim 19, wherein the computer program instructions, that when executed generate the encoded representation of the binary object, when executed calculate a sum of the prime factor and a value of one, identify one or more prime factors of the sum, and map each of the one or more prime factors of the sum to a corresponding prime factor representation in the plurality of prime factor representations for inclusion in the encoded representation.

\*   \*   \*   \*   \*